(12) United States Patent
Burton et al.

(10) Patent No.: US 7,496,725 B2
(45) Date of Patent: *Feb. 24, 2009

(54) SYSTEMS AND METHODS OF DATA MIGRATION IN SNAPSHOT OPERATIONS

(75) Inventors: David Alan Burton, Vail, AZ (US); Noel Simen Otterness, Lafayette, CO (US)

(73) Assignee: Pillar Data Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/598,868

(22) Filed: Nov. 13, 2006

(65) Prior Publication Data

US 2007/0061533 A1    Mar. 15, 2007

Related U.S. Application Data

(63) Continuation of application No. 10/600,417, filed on Jun. 19, 2003, now Pat. No. 7,136,974.

(51) Int. Cl.
*G06F 12/16* (2006.01)
*G06F 13/00* (2006.01)

(52) U.S. Cl. .................................... 711/162; 711/165
(58) Field of Classification Search ................... 711/162
See application file for complete search history.

(56) References Cited

U.S. PATENT DOCUMENTS

| | | | |
|---|---|---|---|
| 5,379,391 A | 1/1995 | Belsan et al. | |
| 5,499,354 A | 3/1996 | Aschoff et al. | |
| 5,535,372 A | 7/1996 | Benhase et al. | |
| 5,539,915 A | 7/1996 | Burton et al. | |
| 5,581,743 A | 12/1996 | Burton et al. | |
| 5,774,682 A | 6/1998 | Benhase et al. | |
| 5,778,430 A | 7/1998 | Ish et al. | |
| 5,819,292 A * | 10/1998 | Hitz et al. | 707/203 |
| 5,930,481 A | 7/1999 | Benhase et al. | |
| 5,948,110 A | 9/1999 | Hitz et al. | |
| 6,014,730 A | 1/2000 | Ohtsu et al. | |
| 6,182,198 B1 | 1/2001 | Hubis et al. | |
| 6,247,099 B1 | 6/2001 | Skazinski et al. | |
| 6,393,535 B1 | 5/2002 | Burton et al. | |
| 6,425,051 B1 | 7/2002 | Burton et al. | |
| 6,434,681 B1 * | 8/2002 | Armangau | 711/162 |
| 6,460,122 B1 | 10/2002 | Otterness et al. | |

(Continued)

*Primary Examiner*—Hyung S Sough
*Assistant Examiner*—Shawn Eland
(74) *Attorney, Agent, or Firm*—Robert Moll

(57) ABSTRACT

The invention relates to methods of snapshot operation for a data storage system with a host communicating with a cache memory, a source Virtual Logical Unit Number (VLUN) and a target VLUN, including generating first metadata (e.g., bitmaps and log files pointers) to locate first snapshot data and to indicate when the first snapshot data is in the target VLUN and generating second metadata to locate second snapshot data and to indicate when the second snapshot data is in the target VLUN, wherein the first and second metadata locate the same data in the target VLUN. The invention relates to systems that implement the methods. It relates to destaging data to maintain data consistency including reading metadata for snapshots, searching the metadata to identify snapshots that require original data to be destaged, destaging the original data to target storage, and updating metadata to locate original data and indicate destage completion.

31 Claims, 9 Drawing Sheets

U.S. PATENT DOCUMENTS

| | | |
|---|---|---|
| 6,480,969 B1 | 11/2002 | Hitz et al. |
| 6,487,680 B1 | 11/2002 | Skazinski et al. |
| 6,490,659 B1 | 12/2002 | McKean et al. |
| 6,618,794 B1 | 9/2003 | Sicola et al. |
| 2001/0049779 A1 | 12/2001 | Shimada et al. |
| 2002/0029281 A1 | 3/2002 | Zeidner et al. |
| 2002/0053009 A1 | 5/2002 | Selkirk et al. |
| 2002/0156987 A1 | 10/2002 | Gajjar et al. |
| 2003/0101321 A1 | 5/2003 | Ohran |
| 2003/0131278 A1 | 7/2003 | Fujibayashi |
| 2004/0024961 A1 | 2/2004 | Cochran et al. |

* cited by examiner

US 7,496,725 B2

SYSTEMS AND METHODS OF DATA MIGRATION IN SNAPSHOT OPERATIONS

This application is a continuation of U.S. application Ser. No. 10/600,417, entitled, Systems and Methods of Data Migration in Snapshot Operations, filed on Jun. 19, 2003, now U.S. Pat. No. 7,136,974 B2.

This application incorporates herein by reference U.S. application Ser. No. 10/354,797, entitled, Methods and Systems of Host Caching, filed on Jan. 29, 2003, now U.S. Pat. No. 6,965,979 B2 and U.S. application Ser. No. 10/440,347, entitled, Methods and Systems of Cache Memory Management and Snapshot Operations, filed on May 16, 2003, now U.S. Pat. No. 7,124,243 B2.

BACKGROUND

The present invention relates to data migration in snapshot operations in a data storage system.

A data storage system may employ snapshots (i.e., an image of data at an instant of time) for a variety of operations including backup, data mining, or testing of software programs. A snapshot operation results in two data images: (1) the source data also referred to as active data that can be read and written by applications as soon as the snapshot is created, and (2) the snapshot data that can be backed up or mined or otherwise used. The need for high data availability often requires frequent snapshots that consume resources such as cache memory, internal memory bandwidth, storage device capacity and the storage device bandwidth.

Data storage systems use several techniques to migrate the snapshot data from the source VLUN to the target VLUN so that the source data can be further modified without loss of the snapshot data. Some of these techniques include (1) a complete copy snapshot, and (2) a partial copy snapshot with separate VLUNs. In a complete copy snapshot operation, the data storage system allocates a new target VLUN for each snapshot that equals the amount of storage provided by the source VLUN at the time of the snapshot. If metadata is also stored with the snapshot data, the space of the target VLUN will be greater than that of the source VLUN. Each target VLUN will store a complete copy of the snapshot data upon migration of the original data from the source VLUN. This technique is simple, but consumes considerable storage capacity especially if there are frequent snapshots. A partial copy snapshot operation still uses multiple target VLUNs to store the snapshot data, but may allocate less storage space since the original data is only migrated when it is modified.

SUMMARY OF THE INVENTION

The present invention relates to snapshot operations for data storage systems. In one snapshot operation, the method generates first metadata to locate first snapshot data and to indicate when the first snapshot data is in the target VLUN and generates second metadata to locate second snapshot data and to indicate when the second snapshot data is in the target VLUN wherein the first and second metadata locate the same data in the target VLUN.

Another feature relates to a snapshot system for a data storage system including a first host that communicates with a cache memory, a source VLUN, a target VLUN, and metadata, including a source VLUN for source data, a target VLUN to store migrated snapshot data, first metadata to indicate when and to locate where the first snapshot data is in the target VLUN, and second metadata to indicate when and to locate where second snapshot data is in the target VLUN wherein the first metadata and the second metadata locate the same snapshot data in the target VLUN.

Another feature relates to a method of destaging of data to maintain data consistency of original data between a cache memory and a target VLUN of a data storage system, including reading the bitmaps for all of the snapshots into a first host memory, reading the log files for all of the snapshots into the first host memory, searching the bitmaps to identify snapshots that require original data to be destaged, destaging the original data to an available location in the target VLUN, updating each log file associated with the identified bitmaps by adding pointers to the original data located in the target VLUN, and updating each associated bitmap to indicate completion of the destage operation to the target VLUN.

Another feature relates to a method of snapshot operation in a data storage system in a first host that communicates with a cache memory, a source VLUN, a target VLUN, first metadata, and second metadata, including receiving requests from an application to modify data in the cache memory, writing the modified data to the cache memory, destaging the original data to the target VLUN to preserve the original data of a first snapshot and a second snapshot, and updating the first and second metadata to locate the original data in the target VLUN.

Another feature relates to a method of snapshot operation in a data storage system in a first host that communicates with a cache memory, a source VLUN, a target VLUN, first metadata, and second metadata, including receiving requests from an application to modify data in the cache memory, writing the modified data to the cache memory, destaging the original data to the target VLUN to preserve the original data of a first snapshot and a second snapshot, and updating the first and second metadata to indicate the presence of and to locate the original data in the target VLUN.

Another feature relates to an error recovery process in a data storage system wherein a first host verifies that original dirty data has or has not been destaged to the target VLUN, including (a) reading a bitmap, wherein if the bitmap contains a 0 in a bit position representing the original dirty data in cache memory, destaging the data to the target VLUN, and wherein if the bitmap contains a 1 in a bit position representing the presence of associated original data in the target VLUN, not destaging the data, (b) removing the dirty data designation for the destaged data; and (c) repeating the steps (a) and (b) until all of the original dirty data is destaged.

DETAILED DESCRIPTION OF THE PREFERRED EMBODIMENTS

The following description includes the best mode of carrying out the invention. The detailed description is made for the purpose of illustrating the general principles of the invention and should not be taken in a limiting sense. The scope of the invention is determined by reference to the claims. Each part is assigned its own part number throughout the specification and drawings.

Figure 1:
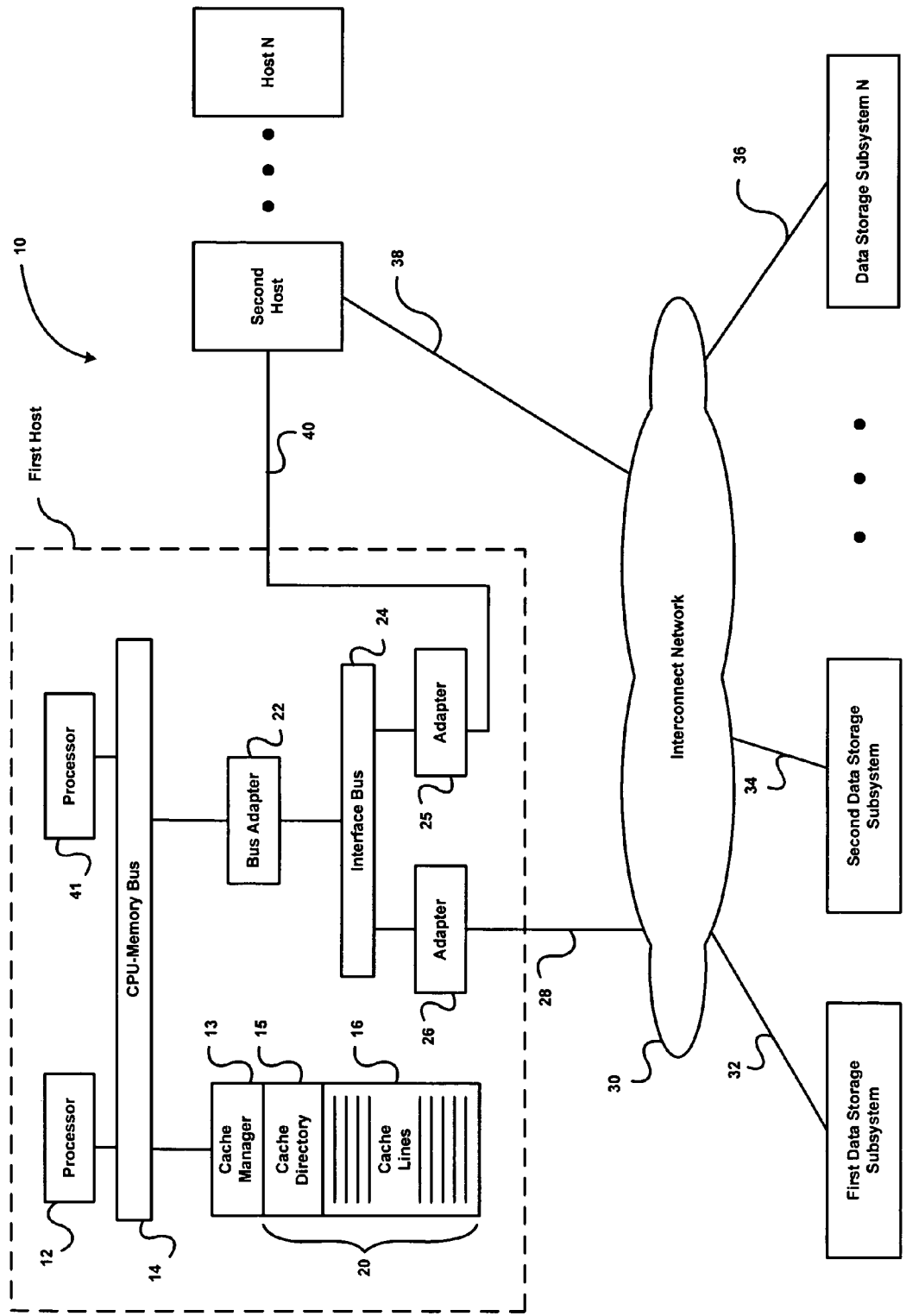
FIG. 1 illustrates an embodiment of a data storage system.

FIG. 1 illustrates a data storage system 10, including a plurality of hosts coupled to data storage subsystem(s). Each host is a computer that can connect to client(s), to data storage subsystem(s), and each other. Each host provides software/hardware interfaces such as network interface cards and software drivers to implement Ethernet, Fibre Channel, ATM, and SCSI, and InfiniBand. Hennessy and Patterson, *Computer Architecture: A Quantitative Approach* (2003), and Patterson and Hennessy, *Computer organization and Design: The Hardware/Software Interface* (1998) describe computer hardware and software, storage systems, caching, and networks and are incorporated by reference.

In an embodiment, the first host includes a motherboard with a CPU-memory bus 14 that communicates with dual processors 12 and 41. The processor used is not essential to the invention and could be any suitable processor such as the Intel Pentium 4 processor. Also, one could implement the invention using a single processor in each host or more than two processors to meet more stringent performance requirements. The arrangement of the processors is not essential to the invention.

The first host includes a cache manager 13, a cache directory 15, and cache lines 16. The cache memory 20 is nonvolatile memory or volatile memory or a combination of both. Nonvolatile memory protects data in the event of a power interruption or a host failure. Data is defined as including user data, instructions, and metadata. Nonvolatile memory may be implemented with a battery that supplies power to a DRAM to make it nonvolatile memory when a conventional external power interrupt circuit detects a power interruption or with inherently nonvolatile semiconductor memory.

Each host includes a bus adapter 22 between the CPU-memory bus 14 and an interface bus 24. Each host runs an operating system such as Linux, UNIX, a Windows OS, or another suitable operating system. Tanenbaum, *Modern Operating Systems* (2001) describes operating systems in detail and is hereby incorporated by reference. The first host is representative of the other hosts, but this feature is not essential to the invention.

The first host can communicate with the second host through an interconnect 40, shown as connected to an adapter 25 to the interface bus 24. The PCI bus is one suitable interface bus and the interconnect 40 may be any suitable known bus, SAN, LAN, or WAN technology. In an embodiment, the interconnect 40 is a dedicated Fibre Channel (FC) point-to-point link that connects to FC-PCI bus adapter 25 to provide fast point-to-point communication between the hosts.

In an alternative embodiment, the interconnect network 30 such as a FC fabric provides extra bandwidth for host-to-host communications. In this embodiment, links 28, 38 connect to the interconnect network 30 and the hosts use link 28 and link 38 when available. FC standard software can set priority levels to ensure high priority peer-to-peer requests, but there will still be some arbitration overhead and latency in claiming ownership of the links. For example, if links 28 and 38 are busy transferring data when a write request arrives, that operation must complete before either link is free for arbitration.

If the interconnect 40 ever fails, communication between hosts can be handled using the interconnect network 30. The interconnect network 30 can be implemented by interconnects used in data storage systems such as Fibre Channel, SCSI, InfiniBand, or Ethernet, and the type of interconnect is not essential to the invention. In either embodiment, redundant communication between hosts ensures the data storage system has high availability. See Clark, *IP SANs: A Guide to iSCSI, iFCP, and FCIP Protocols for Storage Area Networks* (2002) and Clark, *Designing Storage Area Networks* (1999) are incorporated herein by reference.

In an embodiment, the data storage subsystems shown in FIG. 1 can be those described in the co-pending U.S. patent application Ser. No. 10/264,603, entitled, *Systems and Methods of Multiple Access Paths to Single Ported Storage Devices*, filed on Oct. 3, 2002, and incorporated herein by reference. It is understood, however, that other storage device(s) or data storage subsystems could be used instead of the data storage subsystems described in that U.S. patent application.

As shown in FIG. 1, the first host connects, or couples, to the first data storage subsystem through the bus adapter 22, the interface bus 24, the adaptor 26, the link 28, the interconnect network 30, and the link 32. To connect to the second data storage subsystem, the first host uses the same I/O path except the data passes through link 34, while the second host uses the same type of I/O components plus link 32 to communicate with the first data storage subsystem, or link 34 to communicate with the second data storage subsystem, or link 36 to the data storage subsystem N.

Each storage device in a data storage subsystem is assigned a logical unit number (LUN) that is an identifier for the storage device. A virtual logical unit number (VLUN) is an abstraction of the storage device(s) or the virtualization of the data storage subsystems such as a linear array of 512-byte date blocks as it appears to the data storage system users. In various embodiments, the implementation of a VLUN may be striped (i.e., spread) over multiple RAID groups for added performance, spread over sections of a RAID group for flexibility, or copied on multiple RAID groups for reliability.

Figure 2:
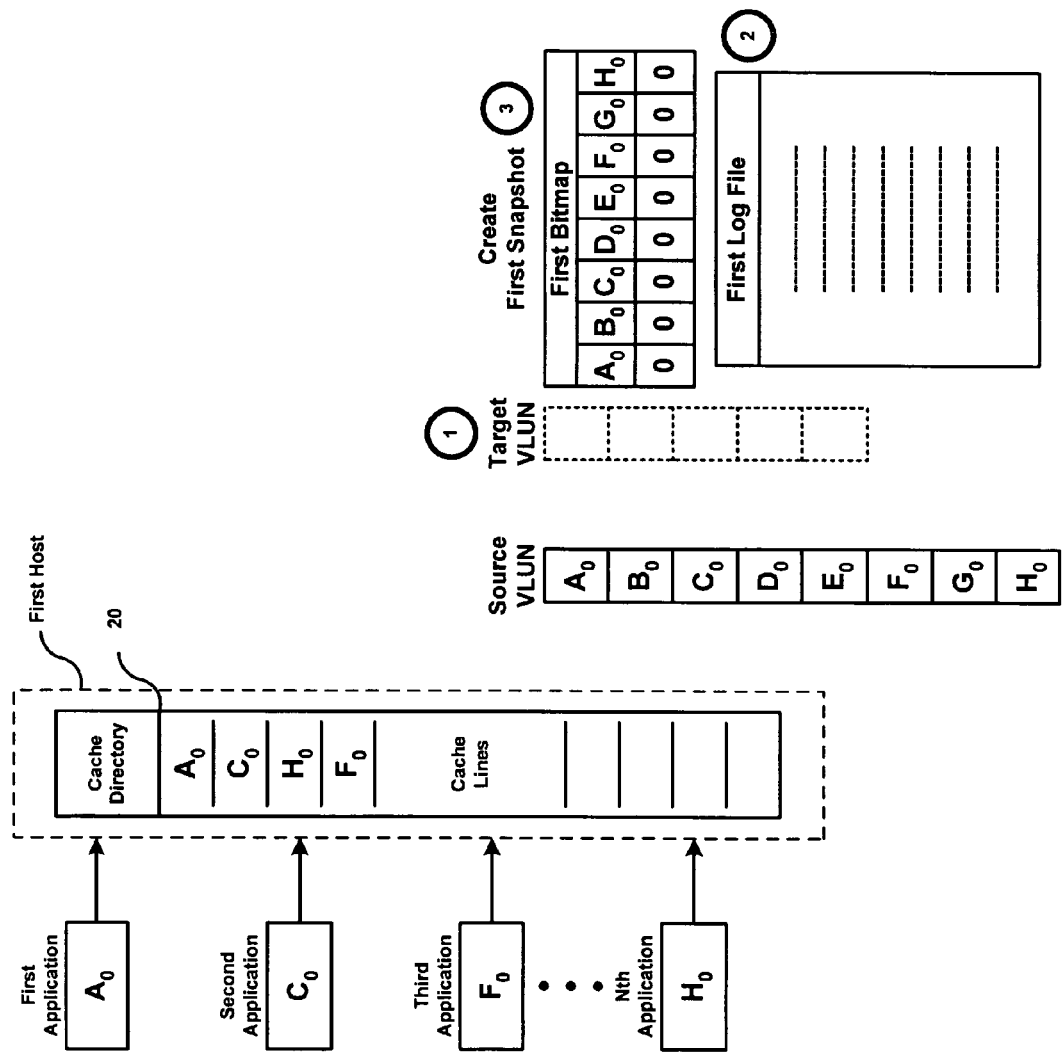
FIG. 2 illustrates multiple applications and a cache memory and the state of data in a source VLUN and a target VLUN at the creation of a first snapshot in a snapshot operation.

FIG. 2 illustrates a data storage system engaged in a snapshot operation. The data storage system includes a source VLUN for active data (e.g., data block, file, or record) in production and the target VLUN for snapshot data. Letters A through H represent the data and the numerical subscript associated with each letter represents the number of writes performed on that data element. A first application through the Nth application can write to the data, and read the data in processes or threads in applications. The data storage system also includes a first host having a cache memory 20 including a cache directory and cache lines.

To illustrate the snapshot operation taking the first snapshot, assume at a point in time the source VLUN contains original data represented by data elements $A_0$, $B_0$, $C_0$, $D_0$, $E_0$, $F_0$, $G_0$, and $H_0$. Let's also assume multiple applications have requested some of that data so that data elements $A_0$, $C_0$, $H_0$, and $F_0$ are in the cache memory at the time of the first snapshot.

The first snapshot will preserve an image of the original data present in the source VLUN at that time in the following manner. For brevity, the steps will be described as executed by the data storage system. It should be understood that the steps are those of one or more processes and/or threads and carried out by a host and/or data storage subsystem. See Tanenbaum cited and incorporated herein especially chapters 1-6. Initially, at step 1, the data storage system allocates space for the target VLUN and associated metadata. As depicted, the space of target VLUN will usually be less than the source VLUN. At step 2, the snapshot operation will generate a first log file for the first snapshot. The first log file will contain pointers to locate the original data elements $A_0$, $B_0$, $C_0$, $D_0$, $E_0$, $F_0$, $G_0$ and $H_0$ in the target VLUN after the original data has migrated from the source VLUN to the target VLUN. At step 3, the snapshot operation will generate a first bitmap for the target VLUN that will show 1 if the original data element is in the target VLUN. Thus, if original data elements $A_0$, $B_0$, $C_0$, $D_0$, $E_0$, $F_0$, $G_0$, and $H_0$ are in the target VLUN, the first bitmap will show 1 for each data element. In an alternative embodiment, the snapshot operation will generate the first bitmap before the first log file. At the creation of the first snapshot, none of the original data is in the target VLUN so each bit position in the first bitmap contains a 0. As shown, the string of 0s, represent the absence of the data elements $A_0$, $B_0$, $C_0$, $D_0$, $E_0$, $F_0$, $G_0$, and $H_0$, respectively in the target VLUN. In an alternative embodiment, 1s can represent the absence of data elements in the target VLUN, and the 0s the presence of the data elements. Bitmap and log files and other forms of snapshot metadata can be stored in the target VLUN or the host memory or simply stored on the storage devices associated with the source VLUN.

Figure 3:
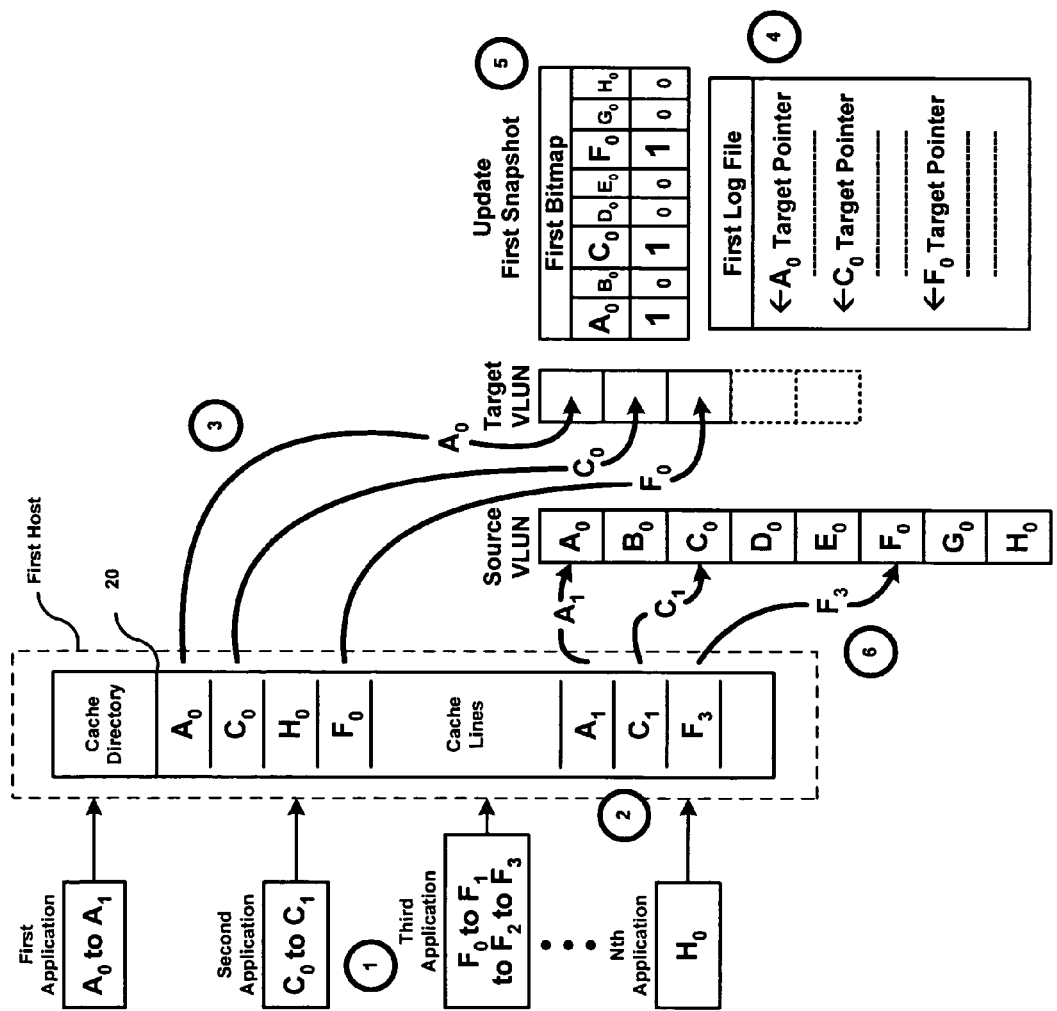
FIG. 3 illustrates multiple applications, the cache memory, the destaging of data to the source VLUN and to the target VLUN, and a first bitmap and a first log file of the first snapshot in the snapshot operation.

FIG. 3 illustrates the snapshot operation, the target VLUN, and how the data storage system handles writes on data in the source VLUN after the first snapshot but before the second snapshot. At step 1 and prior to creating the second snapshot, the applications include modifications to some of the data also held in cache memory 20. Thus, the data storage system receives requests to modify the data in cache memory 20, e.g., data $A_0$ to $A_1$, $C_0$ to $C_1$, and $F_0$ to $F_1$ to $F_2$ to $F_3$. It should be understood that $H_0$ in cache memory 20 remains unchanged because the Nth application did not change it. At step 2, the data storage system allocates new cache lines for the modified data (i.e., $A_1$, $C_1$, and $F_3$) written to cache memory 20. At step 3, the data storage system destages (i.e., writes) the original data of the first snapshot from cache memory 20, e.g., data elements $A_0$, $C_0$, and $F_0$, to the target VLUN to preserve the first snapshot. At step 4, the pointers of the first log file are added pointing to the new locations of the data elements $A_0$, $C_0$, and $F_0$ in the target VLUN. At step 5, the corresponding first bitmap is updated to 10100100 as shown indicating the presence of the data elements $A_0$, $C_0$, and $F_0$ in the target VLUN, that is, the completion of migration of data elements $A_0$, $C_0$, and $F_0$ from the source VLUN to the target VLUN. At step 6, the modified data elements (i.e., $A_1$, $C_1$, and $F_3$) in the cache memory 20 are destaged to the source VLUN to maintain data consistency between the cache memory 20 and the source VLUN. In contrast to the above, the data storage system did not modify the original data elements $B_0$, $D_0$, $E_0$, $G_0$, and $H_0$ in the source VLUN and therefore, the corresponding bit positions still contain 0s. In an alternative embodiment, the destaging of data to the source VLUN may precede the destaging of the data to the target VLUN.

Figure 4:
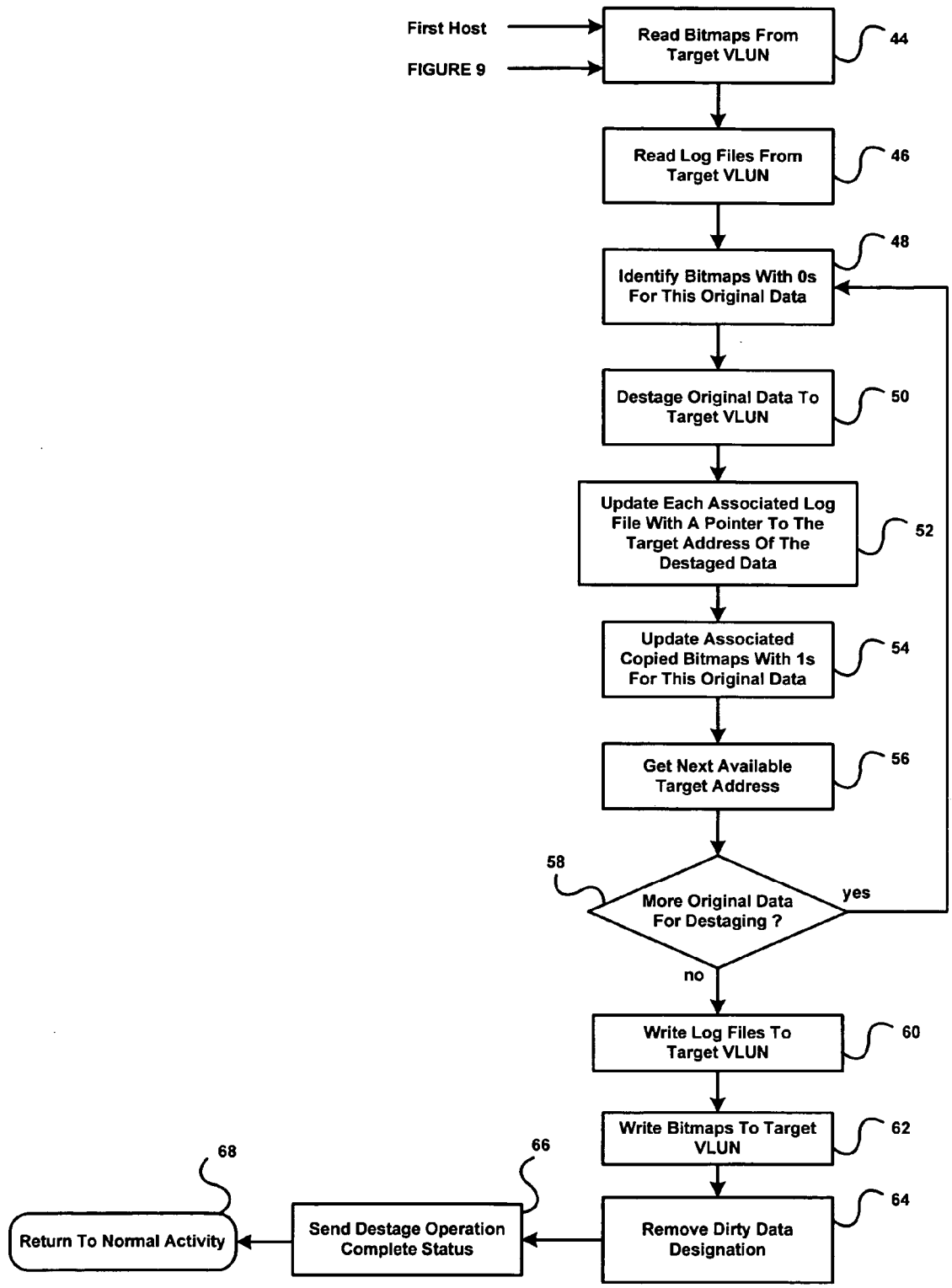
FIG. 4 illustrates a flow diagram of a target destage operation.

FIG. 4 illustrates a flow diagram of a target destage operation. In an embodiment, a first host begins a target destage operation at step 44 to maintain data consistency of original data between cache memory 20 and the target VLUN. At step 44, the bitmaps for all of the snapshots are read into the first host memory. At step 46, the log files for all of the snapshots are read into the first host memory. At step 48, the bitmaps are searched to identify snapshots that require original data elements to be destaged as identified by a 0 in the associated bit position. At step 50, the original data will be destaged to an available location in the target VLUN. At step 52, each log file associated with the identified bitmaps, will be updated by adding pointer addresses to the original data now located in the target VLUN. At step 54, the first host updates each associated bitmap by changing the associated bit position to 1 which indicates completion of the destage operation to the target VLUN. In subsequent searches of the bitmaps the 1s indicate the presence of original data elements in the target VLUN. At step 56, a next available target address is determined for the next destage operation. At step 58, the first host checks the cache memory 20 to see if other original dirty data elements need to be destaged to the target VLUN. If so, the first host returns to step 48 to identify additional snapshots requiring original data to be destaged. If not, the first host writes the updated bitmaps and log files to the target VLUN. At step 60, the log file is written to the target VLUN. At step 62, the bitmap(s) are written to the target VLUN. At step 64, the first host removes the dirty data designation at the cache manager for the destaged data still in cache. At step 66, the target destage operation completes, and at step 68, the data storage system returns to normal operation.

Figure 5:
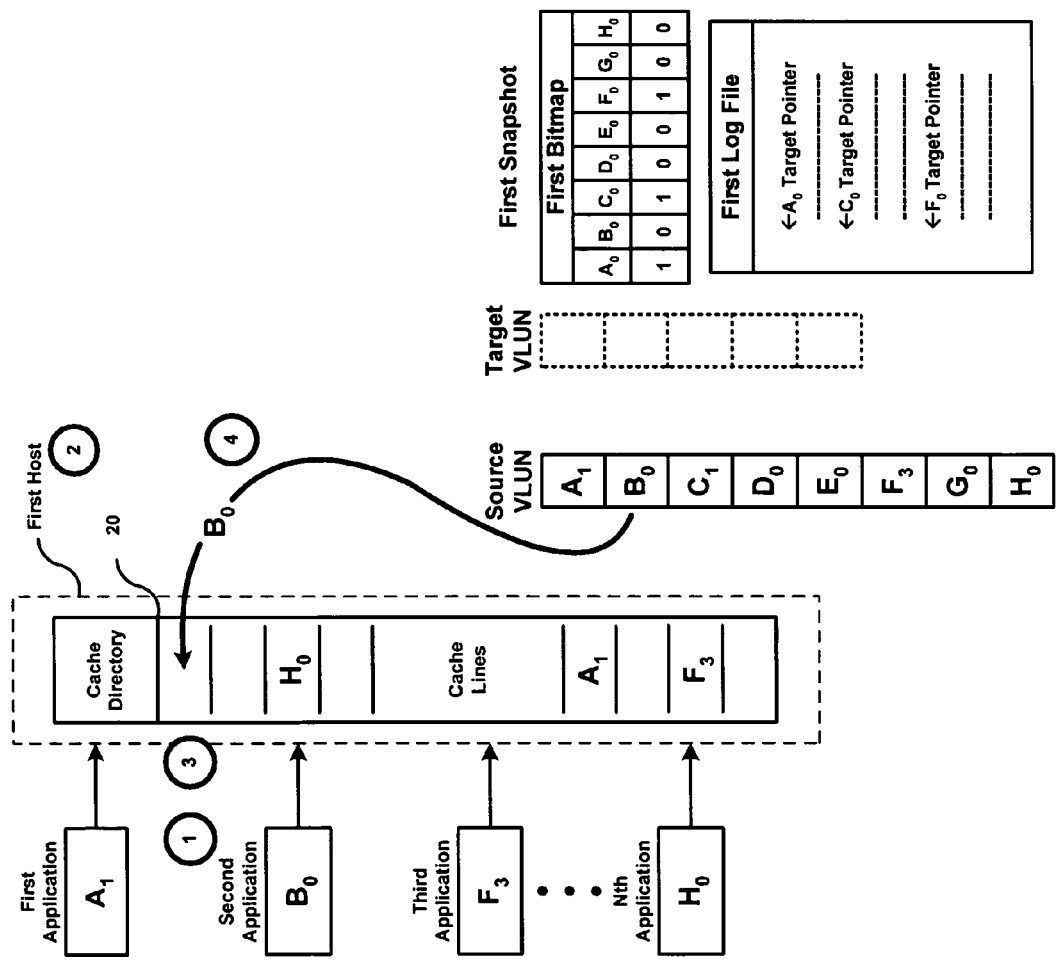
FIG. 5 illustrates multiple applications and the cache memory and the staging of data to the cache memory from the source VLUN.

FIG. 5 illustrates the data storage system, the source VLUN, the target VLUN, the first snapshot, and a request for data from second application where the data does not reside in cache memory 20 and must be staged from the source VLUN. At step 1, the application requests data element $B_0$. At step 2, the data storage system determines that the data element $B_0$ is not in cache memory 20, that is, a cache miss. Thus, at step 3, the system allocates a new cache line in the cache memory 20. At step 4, the data storage system stages the data element $B_0$ from the source VLUN to the allocated cache line without changing the first snapshot data in the target VLUN, or the first bitmap and first log file, referred to individually or together as the first snapshot metadata.

Figure 6:
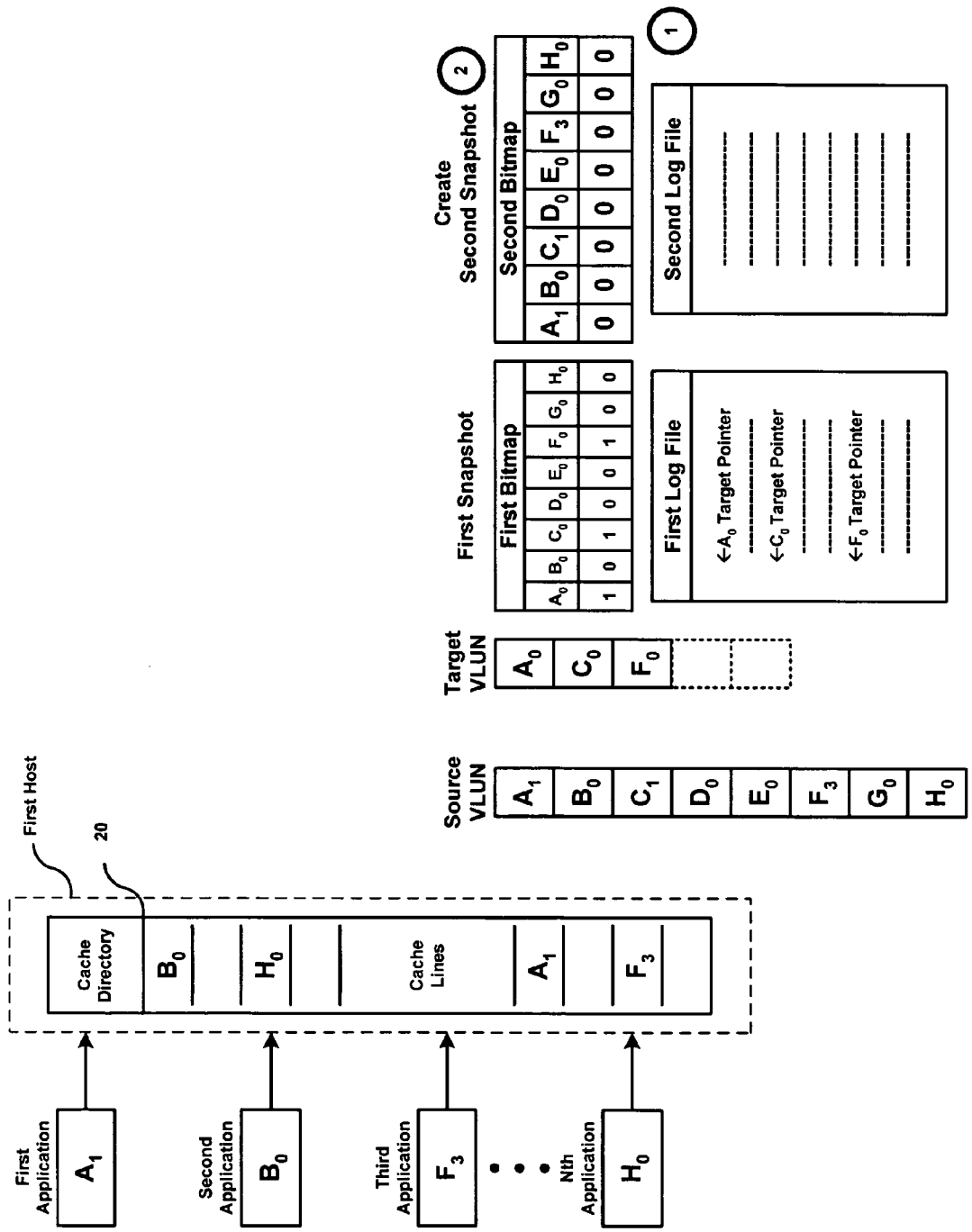
FIG. 6 illustrates multiple applications, the cache memory, the state of data in the source VLUN, the target VLUN, and the first snapshot at the creation of a second snapshot in the snapshot operation.

FIG. 6 illustrates the data storage system, the source VLUN, the target VLUN, the first snapshot and the creation of a second snapshot. When we reach a later point in time, the source VLUN contains the data elements represented by $A_1$, $B_0$, $C_1$, $D_0$, $E_0$, $F_3$, $G_0$, and $H_0$. This will be referred to as the original data of that later time and the second snapshot will preserve this data image. To make it realistic, let's also assume that the multiple applications have requested some of the source data so that it is resident in cache lines of the cache memory 20, that is, data elements $B_0$, $H_0$, $A_1$, and $F_3$.

At step 1, the data storage system creates a second log file for the second snapshot. The second log file will contain address pointers that locate the original data elements $A_1$, $B_0$, $C_1$, $D_0$, $E_0$, $F_3$, $G_0$ and $H_0$ of the second snapshot in the target VLUN after that data has been migrated from the source VLUN. At step 2, the data storage system creates a second bitmap for the second snapshot. It should be understood that the stated order of creating the log file and bitmap is not essential to the invention. Again, the string of 0s in the second bitmap indicates that there are no data elements in the target VLUN. Similar to before, 0s in the second bitmap represent the absence of the data elements $A_1$, $B_0$, $C_1$, $D_0$, $E_0$, $F_3$, $G_0$, and $H_0$, and the 1s represent the presence of the data elements $A_1$, $B_0$, $C_1$, $D_0$, $E_0$, $F_3$, $G_0$, and $H_0$ in the target VLUN. As discussed before in connection with FIG. 2, the 1s and 0s representing the absence and presence of data elements in the target VLUN can take on the opposite sense.

Figure 7:
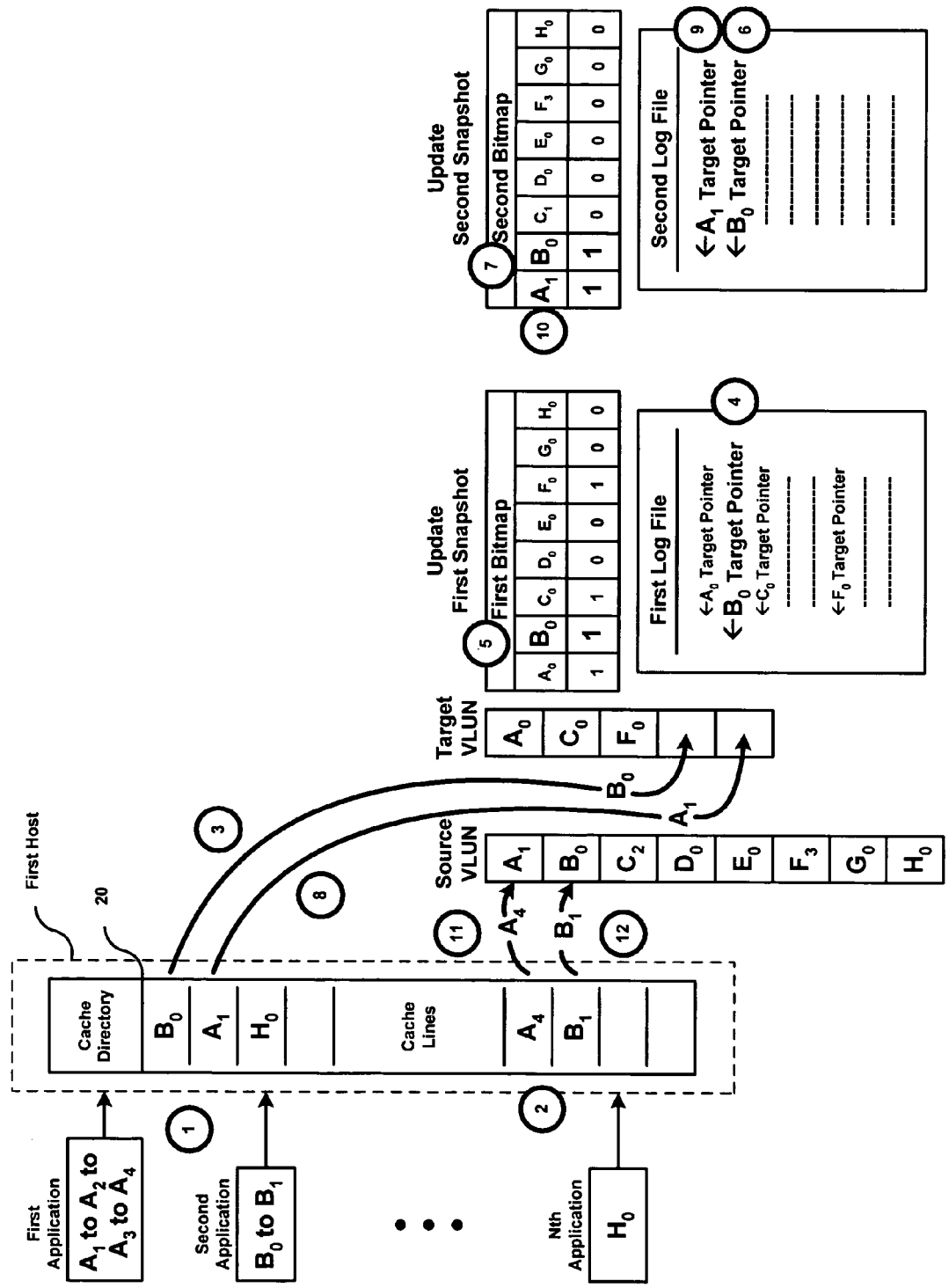
FIG. 7 illustrates multiple applications, the cache memory, the destaging of data to the source VLUN and to the target VLUN, the status of the first bitmap and a second bitmap, and the status of the first log file and a second log file in the snapshot operation.

FIG. 7 illustrates the snapshot operation and an embodiment of how the data storage system handles writes on original data contained in the source VLUN. After creating the second snapshot but prior to creating another snapshot, the applications further modify some of the data also being held in cache memory 20, that is, $A_1$ to $A_2$ to $A_3$ to $A_4$ and $B_0$ to $B_1$. Again, let's assume $H_0$ remains unchanged by its application. At step 1, the data storage system receives requests from the applications to modify the corresponding data, e.g., $A_1$ to $A_4$, and $B_0$ to $B_1$ in cache memory 20. At step 2, the data storage system allocates new cache lines and writes the modified data to the new cache lines. At step 3, the data storage system writes the data element $B_0$ to the target VLUN in order to preserve the original data of the first snapshot and the second snapshot. At step 4, the data storage system adds a pointer to the data element $B_0$ in the first log file pointing to the new location of the data in the target VLUN. At step 5, the data storage system updates the corresponding first bitmap to 11100100 indicating the presence of the newly destaged data element $B_0$ in the target VLUN. At step 6, the data storage system adds a pointer to data element $B_0$ in the second log file pointing to the new location of the data in the target VLUN. At step 7, the data storage system updates the corresponding second bitmap to 01000000 indicating the presence of the data element $B_0$ in the target VLUN. At step 8, the data storage system writes data element $A_1$ to the target VLUN in order to preserve the original data of the second snapshot. At step 9, the data storage system adds a pointer to data element $A_1$ in the second log file pointing to the new location of the data element $A_1$ in the target VLUN. At step 10, the data storage system updates the second bitmap to 11000000 indicating the presence of the data element $A_1$ in the target VLUN. At steps 11 and 12, the modified data in the cache is destaged to the source VLUN to maintain consistency. In an alternative embodiment, the order of destaging modified data to the source VLUN may be in reverse order. In yet another embodiment, the source data may be destaged before the target data is destaged.

Figure 8:
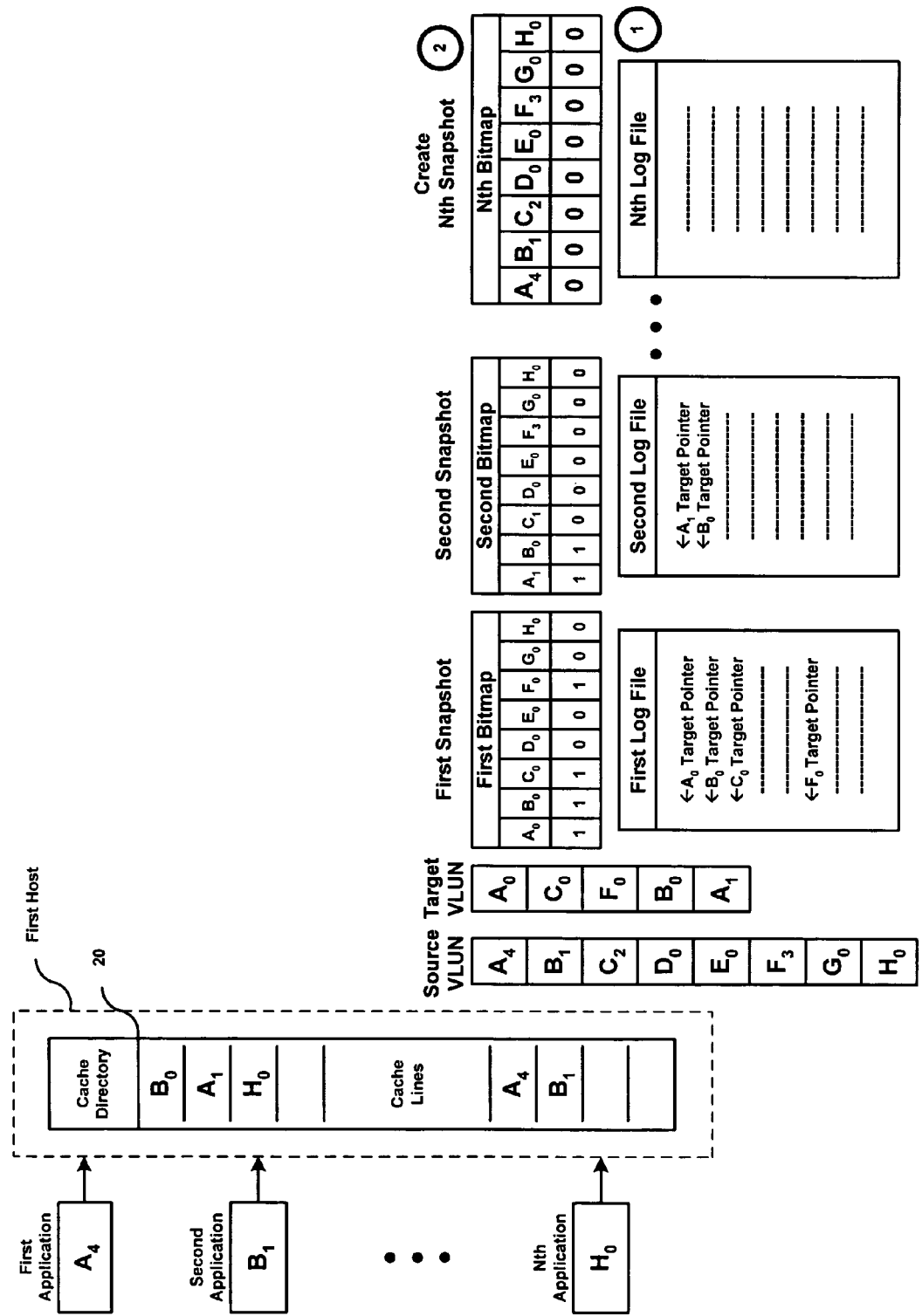
FIG. 8 illustrates multiple applications, the cache memory, and the state of data in the source VLUN, the target VLUN, the first snapshot and the second snapshot at the creation of an Nth snapshot in the snapshot operation.

FIG. 8 illustrates the data storage system, the target VLUN, the first snapshot, the second snapshot, and the creation of an Nth snapshot. At time N, the source VLUN contains the original data elements represented by $A_4$, $B_1$, $C_2$, $D_0$, $E_0$, $F_3$, $G_0$, and $H_0$. This will be referred to as the original date of time N and is the data image preserved by snapshot N. Source data has been requested by multiple applications between the second snapshot and time N and thus is resident in cache lines in the cache memory 20, that is, $H_0$, $A_4$, and $B_1$. At step 1, an Nth log file of the Nth snapshot is created. Log file will contain address pointers that locate the original data elements $A_4$, $B_1$, $C_2$, $D_0$, $E_0$, $F_3$, $G_0$, and $H_0$ in the target VLUN after that data has been migrated from the source VLUN. At step 2, an Nth bitmap of the Nth snapshot is created. The string of 0s in the Nth bitmap N indicates that there are no data elements in the target VLUN for the Nth snapshot.

Figure 9:
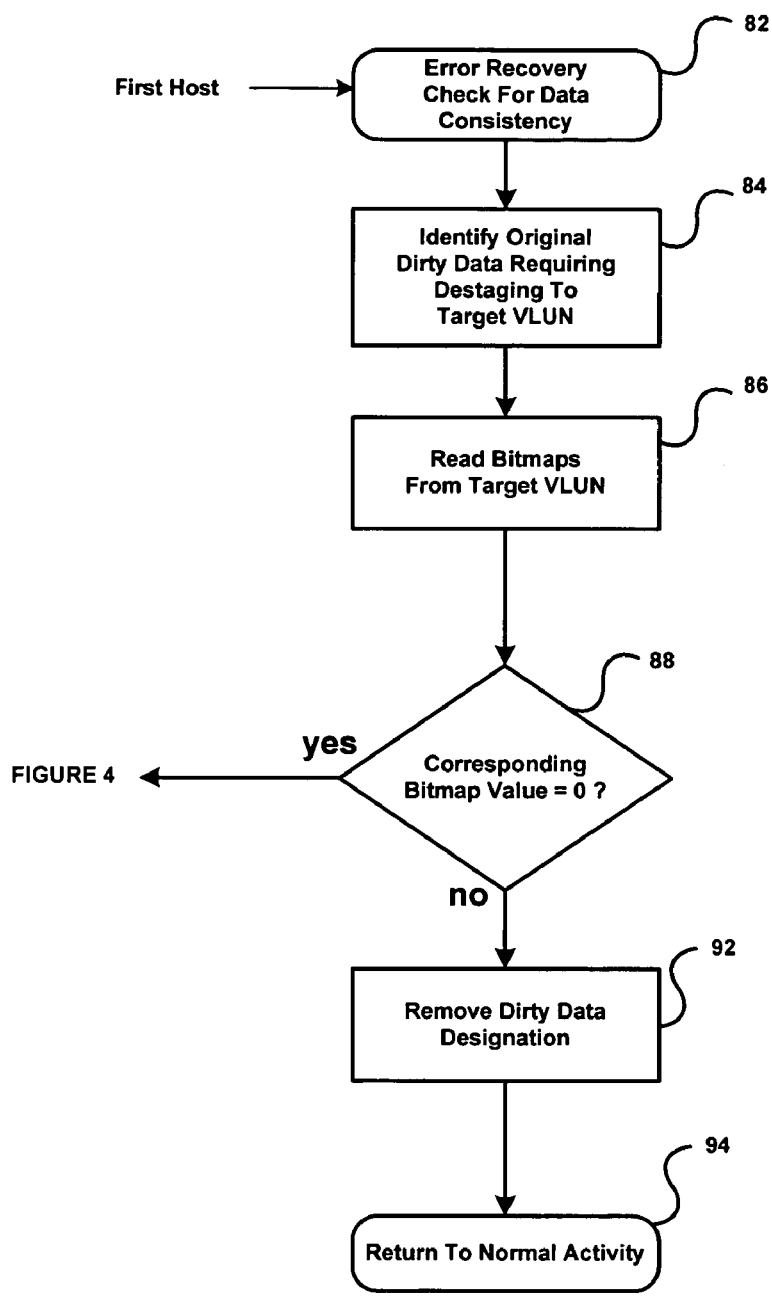
FIG. 9 illustrates a flow diagram of an error recovery process where the system verifies that original dirty data has or has not been destaged to the target VLUN.

FIG. 9 illustrates a flow diagram of an error recovery process wherein the system verifies that original dirty data has or has not been destaged to the target VLUN. In an embodiment, at step 82, the first host enters the error recovery routine to check for consistency of the data in cache memory 20. At step 84, the first host checks if the data is original, dirty data and requires destaging to the target VLUN. At step 86, the first host reads the bitmap from the target VLUN. If, at step 88, the bitmap contains 0s in the bit positions representing the original dirty data in cache memory 20, the first host goes to the routine at step 44 to begin the target destage operation (FIG. 4). If, at step 88, the corresponding bit positions in the bitmaps are 1s, indicating the presence of the original data in the target, no destaging is required. At step 92, the first host removes the dirty data designation for the destaged data still in cache memory 20. At step 94, the data consistency check completes and the data storage system returns to normal operation.

The present invention was described as preferably using bitmaps and log file address pointers to indicate the presence or absence of the original data and to provide access via pointer addresses to the original data in the target. However, the present invention is not limited to this usage. The invention may be implemented using other techniques of searching for original data such as multilayer bitmaps.

What is claimed:

1. A method of snapshot operation for a data storage system with a first host that communicates with a cache memory, a source Virtual Logical Unit Number (VLUN), and a target VLUN, comprising:
   generating first metadata to locate first snapshot data of the source VLUN and to indicate when the first snapshot data is in the target VLUN; and
   generating second metadata to locate second snapshot data of the source VLUN and to indicate when the second snapshot data is in the target VLUN, wherein the first and second metadata locate an original data element of the first snapshot data and of the second snapshot data in the same location in the target VLUN.

2. The method of claim 1, wherein generating the first metadata includes generating a first log file pointer to locate the original data element in the target VLUN.

3. The method of claim 2, wherein generating the first metadata includes changing a first bitmap to indicate the original data element has migrated to the target VLUN.

4. The method of claim 1, wherein generating the second metadata includes generating a second log file pointer to locate the original data eleniont in the target VLUN.

5. The method of claim 4, wherein generating the second metadata lncludes changing a second bitmap to indicate second snapshot data has migrated to the target VLUN.

6. A snapshot system for a data storage system including a first host that communicates with a cache memory, comprising program instructions, wherein the program instructions are executable by the first host, a source Virtual Logical Unit Number (VLUN), a target VLUN, and metadata, comprising:
   a source VLUN for active data;
   a target VLUN to store migrated snapshot data;
   first metadata to indicate when and to locate where first snapshot data of the active data is in the target VLUN; and
   second metadata to indicate when and to locate where second snapshot data of the active data is in the target VLUN wherein the first metadata and the second metadata indicate and locate a data element common to the first and second snapshot data in the target VLUN.

7. The snapshot system of claim 6, wherein the first metadata includes a first log file pointer to locate the first snapshot data in the target VLUN and the second metadata includes a second log file pointer to locate the second snapshot data in the target VLUN.

8. The snapshot system of claim 6, wherein the first metadata includes a first bitmap to indicate when the first snapshot data has migrated to the target VLUN and a first log file to locate the first snapshot data in the target VLUN, and the second metadata includes a second bitmap to indicate when the second snapshot data has migrated to the target VLUN and a second log file to locate the second snapshot data in the target VLUN.

9. The snapshot system of claim 6, wherein a first bitmap and a second bitmap indicate that the first snapshot data and the second snapshot data have migrated to the target VLUN.

10. The snapshot system of claim 6, wherein a first log file and a second log file locate the first snapshot data and the second snapshot data that have migrated to the target VLUN.

11. The snapshot system of claim 6, wherein the first metadata and the second metadata indicate some of the first and second snapshot data remain in the source VLUN.

12. The snapshot system of claim 6, wherein a first log file and a second log file each include a pointer identifying the location of the common data element in the target VLUN.

13. A method of destaging of data to maintain data consistency of original data between a cache memory and a target Virtual Logical Unit Number (VLUN) of a data storage system, comprising:
   reading bitmaps for snapshots from the target VLUN into a first host memory;
   reading log files for the snapshots from the target VLUN into the first host memory;
   searching the bitmaps to identify the snapshots that require original data to be destaged;
   destaging the original data to an available location in the target VLUN;
   updating the log files associated with the bitmaps by adding pointers to the original data located in the target VLUN; and
   updating the bitmaps to indicate completion of the destage operation to the target VLUN.

14. The method of claim 13, further comprising:
   searching the bitmaps for the presence of original data in the target VLUN,
   determining the next available target address location for the next destage operation, and
   checking the cache memory to see if other original dirty data needs to be destaged to the target VLUN and if so, identifying additional snapshots requiring original data to be destaged and if not, writing updated bitmaps and log files to the target VLUN.

15. The method of claim 13, further comprising writing the log files and the bitmaps to the target VLUN, removing a dirty data designation for the destaged data still in cache memory, and sending a destage operation complete status.

16. A method of snapshot operation in a data storage system in a first host that communicates with a cache memory, a source Virtual Logical Unit Number (VLUN), a target VLUN, first metadata, and second metadata, comprising:
   receiving requests from an application to modify data in the cache memory;
   writing the modified data to the cache memory;
   destaging the original data to the target VLUN to preserve the original data of a first snapshot and a second snapshot; and
   updating the first and second metadata to locate original data common to the first and second snapshot in the target VLUN.

17. The method of claim 16, further comprising destaging the first and second metadata to the target VLUN.

18. The method of claim 16, further comprising updating the first and second metadata to indicate the presence of the destaged original data in the target VLUN.

19. The method of claim 18, further comprising destaging the first and second metadata to the target VLUN.

20. The method of claim 16, further comprising destaging the modified data in the cache memory to the source VLUN to maintain data consistency.

21. A method of snapshot operation in a data storage system in a first host that communicates with a cache memory, a source Virtual Logical Unit Number (VLUN), target VLUN, a plurality of bitmaps, and a plurality of log files, comprising:
   receiving requests from an application to modify original data in the cache memory;
   writing the modified data to the cache memory;
   destaging the original data to the target VLUN to preserve the original data of a first snapshot and a second snapshot;
   adding pointer in a first log file to locate the original data in the target VLUN;
   updating a first bitmap to indicate the presence of the destaged original data in the target VLUN;
   adding a pointer to the original data in a second log file to locate the original data in the target VLUN; and
   updating a second bitmap to indicate the presence of the original data in the target VLUN.

22. The method of claim 21, further comprising destaging the modified data in the cache memory to the source VLUN to maintain consistency.

23. The method of claim 21, further comprising destaging the first and second bitmaps and the first and second log files to the target VLUN.

24. A method of error recovery in a data storage system wherein a first host verifies that original dirty data has or has not been destaged to a target Virtual Logical Unit Number (VLUN), comprising:
   (a) reading a bitmap, wherein if the bitmap contains a value in a bit position representing an original dirty data element in cache memory, destaging the original data element to the target VLUN, and wherein if the bitmap contains an inverse value in the bit position representing the presence of the original data element in the target VLUN, not destaging the original data element;
   (b) removing the dirty data designation for the destaged original data element;
   (c) updating two or more pointers locating the destaged original data element in a location of the target VLUN; and
   (d) repeating the steps (a) and (b) and (c) until all of the original dirty data is destaged.

25. A method of snapshot operation for a data storage system with a first host that communicates with a cache memory, a source Virtual Logical Unit Number (VLUN) and a target VLUN, comprising:
   generating first metadata to locate first snapshot data of the source VLUN and to indicate when the first snapshot data is in the target VLUN, wherein generating the first metadata includes generating a first log file pointer to locate first snapshot data in the target VLUN; and
   generating second metadata to locate second snapshot data of the source VLUN and to indicate when the second snapshot data is in the target VLUN, wherein the first and second metadata locate the same data in the target VLUN, and wherein generating the first metadata includes changing a first bitmap to indicate first snapshot data has migrated to the target VLUN.

26. A method of snapshot operation for a data storage system with a first host that communicates with a cache memory, a source Virtual Logical Unit Number (VLUN) and a target VLUN, comprising:

generating first metadata to locate first snapshot data of the source VLUN and to indicate when the first snapshot data is in the target VLUN; and generating second metadata to locate second snapshot data of the source VLUN and to indicate when the second snapshot data is in the target VLUN, wherein the first and second metadata locate the same data in the target VLUN, wherein generating the second metadata includes generating a second log file pointer to locate second snapshot data in the target VLUN, and wherein generating the second metadata includes changing a second bitmap to indicate second snapshot data has migrated to the target VLUN.

27. A snapshot system for a data storage system including a first host that communicates with a cache memory, a source Virtual Logical Unit Number (VLUN), a target VLUN, and metadata, comprising:

a source VLUN for active data;

a target VLUN to store migrated snapshot data;

first metadata to indicate when and to locate where the first snapshot data of the source VLUN is in the target VLUN, wherein the first metadata includes data first bitmap to indicate when the first snapshot data has migrated to the target VLUN and a first log file to locate the first snapshot data in the target VLUN; and second metadata to indicate when and to locate where second snapshot data of the source VLUN is in the target VLUN wherein the first metadata and the second metadata to indicate and locate the same snapshot data in the target VLUN, and wherein the second metadata includes a second bitmap to indicate when the second snapshot data has migrated to the target VLUN and a second log file to locate the second snapshot data in the target VLUN.

28. A snapshot system for a data storage system including a first host that communicates with a cache memory, a source Virtual Logical Unit Number (VLUN), a target VLUN, and metadata, comprising:

a source VLUN for active data;

a target VLUN to store migrated snapshot data;

first metadata to indicate when and to locate where the first snapshot data of the source VLUN is in the target VLUN; and second metadata to indicate when and to locate where second an snapshot data of the source VLUN is in the target VLUN wherein the first metadata and the second metadata to indicate and locate the same snapshot data in the target VLUN, wherein the first metadata and the second metadata indicate snapshot data remain in the source VLUN.

29. A method of snapshot operation in a data storage system in a first host that communicates with a cache memory, a source Virtual Logical Unit Number (VLUN), a target VLUN, first metadata, and second metadata, comprising:

receiving requests from an application to modify data in the cache memory;

writing the modified data to the cache memory;

destaging the original data of the source VLUN to the target VLUN to preserve the original data of a first snapshot and a second snapshot;

updating the first and second metadata to locate the original data of the source VLUN in the target VLUN; and destaging the first and second metadata to the target VLUN.

30. A method of snapshot operation in a data storage system in a first host that communicates with a cache memory, a source Virtual Logical Unit Number (VLUN), a target VLUN, first metadata, and second metadata, comprising:

receiving requests from an application to modify data in the cache memory;

writing the modified data to the cache memory;

destaging the original data of the source VLUN to the target VLUN to preserve the original data of a first snapshot and a second snapshot;

updating the first and second metadata to locate the original data in the target VLUN;

updating the first and second metadata to indicate the presence of the destaged original data of the source VLUN in the target VLUN; and destaging the first and second metadata to the target VLUN.

31. A method of snapshot operation in a data storage system in a first host that communicates with a cache memory, a source Virtual Logical Unit Number (VLUN), a target VLUN, first metadata, and second metadata, comprising:

receiving requests from an application to modify data in the cache memory;

writing the modified data to the cache memory;

destaging the original data of the source VLUN to the target VLUN to preserve the original data of a first snapshot and a second snapshot;

updating the first and second metadata to locate the original data in the target VLUN; and destaging the modified data in the cache memory to the source VLUN to maintain data consistency.

* * * * *